United States Patent
Russo

(10) Patent No.: US 7,113,654 B2
(45) Date of Patent: Sep. 26, 2006

(54) COMPUTATIONALLY EFFICIENT MODELING OF IMAGERY USING SCALED, EXTRACTED PRINCIPAL COMPONENTS

(75) Inventor: Leonard E. Russo, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/334,816

(22) Filed: Dec. 31, 2002

(65) Prior Publication Data

US 2003/0156764 A1    Aug. 21, 2003

Related U.S. Application Data

(60) Provisional application No. 60/353,476, filed on Jan. 31, 2002.

(51) Int. Cl.
   *G06K 9/32* (2006.01)
(52) U.S. Cl. .................................. 382/298; 382/300
(58) Field of Classification Search ................ 382/173, 382/232, 233, 220, 251, 276, 282, 294, 298, 382/300; 358/3.07, 504, 525, 530
   See application file for complete search history.

(56) References Cited

U.S. PATENT DOCUMENTS

| | | | |
|---|---|---|---|
| 5,377,305 A | 12/1994 | Russo | |
| 5,398,121 A * | 3/1995 | Kowalewski et al. | 358/504 |
| 5,488,422 A * | 1/1996 | Faroudja et al. | 348/448 |
| 5,500,744 A * | 3/1996 | Sabath | 358/3.07 |
| 5,703,965 A * | 12/1997 | Fu et al. | 382/232 |
| 5,838,840 A * | 11/1998 | King et al. | 382/300 |
| 6,111,988 A * | 8/2000 | Horowitz et al. | 382/249 |
| 6,137,914 A | 10/2000 | Ligtenberg et al. | |
| 6,157,414 A | 12/2000 | Sakamoto | |
| 6,229,926 B1 | 5/2001 | Chui et al. | |
| 6,249,614 B1 | 6/2001 | Kolesnik et al. | |
| 6,266,452 B1 * | 7/2001 | McGuire | 382/294 |
| 6,292,591 B1 | 9/2001 | Kondo | |
| 6,298,162 B1 | 10/2001 | Sutha et al. | |
| 6,343,154 B1 | 1/2002 | Bottou et al. | |

(Continued)

OTHER PUBLICATIONS

Leonard E. Russo, "Prospects For Adaptive Principal Component Image Compression"; ARL Federated Laboratory 3rd Annual Symposium, Feb. 2-4, 1999; College Park, MD.

*Primary Examiner*—Amir Alavi
(74) *Attorney, Agent, or Firm*—Robert K. Tendler; Daniel J. Long

(57) ABSTRACT

A computationally efficient modeling system for imagery scales both the original image and corresponding principal component tiles in the same proportion to be able to extract scaled principal components. The system includes recovery of feature weights for the image model by extracting the weights from the reduced size principal component tiles. The use of the reduced size tiles to derive weights dramatically reduces computer overhead both in the generation of the files and in the generation of the weights, and is made possible by the fact that the weights from the scaled down tiles are nearly equal to the weights of the tiles associated with the full size image. The subject system thus reduces computation and the number of bits required to represent features by first scaling the image and then tiling the image in the same proportion. In one embodiment, the scaled down tiles are used as training exemplars used to generate the principal components.

1 Claim, 6 Drawing Sheets

U.S. PATENT DOCUMENTS 6,343,155 B1  1/2002  Chui et al.
6,347,157 B1  2/2002  Chui
6,510,254 B1  1/2003  Nakami et al.

* cited by examiner

| #PCs | Tile size | Quant-ization | PSNR (dB) | Total Rate (bits) |
|---|---|---|---|---|
| 5 | 8x8 | 5 | 29.0 | .09 |
| 5 | 4x4 | 3 | 32.3 | .14 |

| #PCs | Tile size | Quant-ization | PSNR (dB) | Total Rate (bits) |
|---|---|---|---|---|
| 5 | 4x4 | 5 | (N/A) | (N/A) |
| 5 | 4x4 | 3 | 32.3 | .19 |

COMPUTATIONALLY EFFICIENT MODELING OF IMAGERY USING SCALED, EXTRACTED PRINCIPAL COMPONENTS

CROSS REFERENCE TO RELATED APPLICATION

This application claims rights under U.S. Provisional Application Ser. No. 60/353,476, filed Mar. 31, 2002.

STATEMENT OF GOVERNMENT INTEREST

This invention was made with U.S. Government support under Contract No. DAAL01-96-2-0002 with the Army Research Laboratory, and the U.S. Government has certain rights in the invention.

FIELD OF INVENTION

This invention relates to image processing and more particularly to an efficient system for image modeling and compression.

BACKGROUND OF THE INVENTION

The extraction of principal components from images is well known, with one extraction technique using neural networks as described in U.S. Pat. No. 5,377,305. Principal components are those which have self-same characteristics or features from one section of an image to another. This self-same characteristic or feature is encoded in principal component tiles in which the image is first subdivided into rectilinear subsections or tiles. A transform is then applied to the tiles which results in a small number of principal component tiles. The dot product of the principal component tiles with the original image results in a set of weights which when transmitted with the principal component tile permits reconstruction of the image. Mathematically speaking the principal components are the basis of a matrix analysis where one is looking for orthogonal tiles ordered by energy.

Thus the original image is modeled through extraction of principal components. The modeling at least in one instance permits compression so that the transmission of the image can be accomplished on a reduced time scale.

By way of background, as to standard compression methods, first, there is the process of compaction. This is done for conventional applications by some suitable transformation which provides an initial compact representation. In the case of JPEG, for example, the discrete cosine transformation (DCT) provides compaction. Associated with each transformation is a basis. The bases may be of fixed scale as with the JPEG-DCT, or may vary in scale motivated by the prospect for very low bit rate transmission as with current wavelet techniques.

Up until recently, standard compression has not been thought suitable for principal component image modeling and compression, which can involve temporal and characteristics other than spatial characteristics. Standard compression methods such as JPEG or wavelet transforms focus only on the spatial characteristics of the image, with JPEG and wavelet transforms being described in U.S. Pat. Nos. 6,347,157; 6,343,155; 6,343,154; 6,229,926; 6,157,414; 6,249,614; 6,137,914; 6,292,591, and 6,298,162.

Standard image compression uses fixed bases. The results are good for standard imagery and are oriented to same. However, for more exotic imagery, e.g., hyperspectral imagery, there is a need for new modeling and compression techniques.

More specifically, in hyperspectral imagery the number of features used to characterized an image is multiplied. For instance, non-spatial features such as heat, hardness, texture, and color are often times used in image presentation. The fixed basis of JPEG and others cannot handle the expanded feature set associated with hyperspectral imagery. Nor can these techniques handle voxels which are used to encode numbers of additional features of an image. Transmission of voxel images is computationally intense and less computationally intense compression techniques are required for their transmission.

In the past, principal component analysis has been used to indicate what features or characteristics of an image are to be utilized in a compression process. Such characteristics can be spatial or temporal or indeed any of a wide variety of characteristics such as for instance color, heat, or other hyperspectral components. In order to achieve modeling or indeed compression, it is important to identify correlations in an image. How to do this in a computationally efficient manner and one which is universal across all platforms is a challenge.

By way of further background, there are currently two main compression techniques and both are dependent on fixed bases. One, the JPEG standard, is based on the DCT transform to provide compaction. The essence of this technique is based on two factors: the approximation of the Karhunen-Loeve (KL) transform by the DCT and the extent of the autocorrelation function which seems to optimize for most images to 8×8 tiles. Using these factors, the JPEG compression standard made a compromise decision omitting the use of scale. The initial DCT transform on 8×8 tiles provides compaction which is then further compressed using zigzag scanning followed by run length and Huffman coders. JPEG produces good images at moderate compression.

The other relevant technique is wavelet compression. Wavelet technology has challenged assumptions in the JPEG standard on several fronts. Most important, scale is implicit to wavelet techniques. Scale allows ordered extraction of fine and coarse features. Use of scale, from fine to coarse, means that subsequent decomposition will be on decimated image. As a result, wavelet decomposition which provides control over computation is limited by decimation. Each level has ¼ the points of the previous level so computation is about $1.33 N^2 k$ where k is the size of the wavelet filter and N is image size in one dimension. Second, wavelets are usually applied to images on a separable though fixed basis. Thus, wavelet decomposition is applied in the x and y dimensions separately. This seems to fit well with human visual perception which is oriented to horizontal and vertical detail. Two dimensional bases are implicit in this decomposition. Third, a particularly good scheme for quantizing wavelet coefficients, Zero Tree Encoding[2], has significantly advanced the state of the art in wavelet image compression. The combination of scale, compaction and quantization made wavelets the likely candidate for future generation JPEG compression standards.

SUMMARY OF THE INVENTION

As will be seen, in the subject invention a method is described which makes feasible a complete principal component analysis of an image (whether standard or hyperspectral). This is because the subject system includes a method which significantly reduces computation. Moreover, the features derived are image adaptive, unlike fixed basis methods, with the adaptability allowing the possibility of better representation, especially for non-standard imagery.

In one embodiment, the subject system allows extraction of principal components from any kind of image in a computationally efficient manner. The method is based on self-similarity in the same way the wavelet methods described above are based on self-similarity. However, in the subject invention the goal is to introduce scale not just for its own sake but also to reduce computation and the overhead of using data adaptive features. While there are methods for image compression and methods for principal component extraction, the combination of using principal component features to represent imagery while extracting them in a computationally efficient way is unique.

In the subject invention, a computationally efficient modeling system for imagery scales both the original image and corresponding principal component tiles in the same proportion to be able to extract scaled principal components. The system includes recovery of feature weights for the image model by extracting the weights from the reduced size principal component tiles. The use of the reduced size tiles to derive weights dramatically reduces computer overhead, and is made possible by the finding that the weights from the scaled down tiles are nearly equal to the weights of the tiles associated with the full size image. In short, not only are the scaled down images self similar, the scaled down tiles are self similar. This permits the scaled down tiles to be used to generate weights. Using scaled down tiles dramatically reduces computation and the number of bits required to represent features. First scaling the image and then tiling the image in the same proportion provides reduced size tiles which when dot multiplied by the original image produces the required weights. Image transmission involves transmitting only the principal component tiles and the weights which effects the compression. The computational savings using the scaled down tiles is both in generating the tiles and in generating the weights. In one embodiment, the scaled down tiles are used as training exemplars used to generate the principal components.

Departure from prior scaling techniques results in a system in which not only is the image scaled, so are the tiles. Since the tiles associated with a scaled down image are similar to tiles extracted from the full size image, the scaled tiles can be used to generate the weights for creating an image model. The subject invention rests on this finding that 1) for principal component extraction the full scale image may be scaled down and 2) the image can be decomposed into a number of smaller sized tiles. It is a finding of the subject invention that these tiles will in fact be similar to the larger tiles extracted from full image. In short, it is the finding of the subject invention that the smaller tiles will in fact be similar to the larger tiles extracted from the full size image. It is also the finding of the subject invention that principal component tile weights computed from the reduced size and full size images will be almost identical. This permits interpolation between the smaller and larger sized tiles so that the principal component features can be weighted with the extracted weights from the reduced sized tiles, along with the reduced sized tiles themselves being interpolated into full size tiles utilized to reconstruct the original image.

In summary, a computationally efficient modeling system for imagery scales both the original image and corresponding principal component tiles in the same proportion to be able to extract scaled principal components. The system includes recovery of feature weights for the image model by extracting the weights from the reduced size principal component tiles. The use of the reduced size tiles to derive weights dramatically reduces computer overhead both in the generation of the files and in the generation of the weights, and is made possible by the fact that the weights from the scaled down tiles are nearly equal to the weights of the tiles associated with the full size image. The subject system thus reduces computation and the number of bits required to represent features by first scaling the image and then tiling the image in the same proportion. In one embodiment, the scaled down tiles are used as training exemplars used to generate the principal components.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
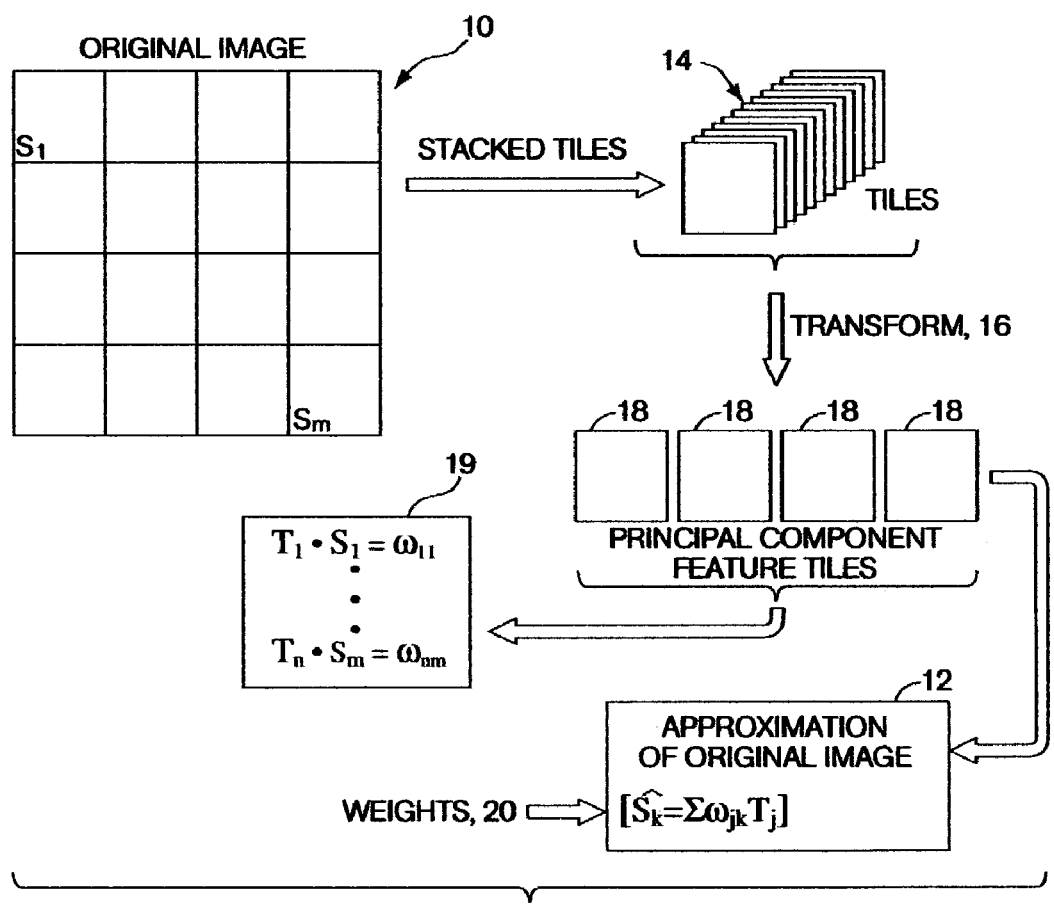
FIG. 1 is a diagrammatic illustration of the modeling of an image utilizing principal component feature tiles, with reconstruction of the original image through the utilization of the transmission of the principal component feature tiles and the weights associated therewith.

Referring to FIG. 1, modeling and compression of an original image 10 is illustrated in which after the subject process is performed an approximation 12 of the original image is generated. The original image is divided up into 1–M segments with each of the segments being reflected in a different tile 14, with the tiled being shown as stacked. These tiles are of the same scale as the original image.

In order to extract principal components relating to features of the image, a transform 16 is applied to tiles 14 which results in a reduced set of tiles 18 referred herein as principal component feature tiles. These tiles are utilized to characterize features in the original image with the transform being one of a number of transforms which extract principal components. As mentioned hereinbefore U.S. Pat. No. 5,377,305 incorporated herein by reference and assigned to the assignee hereof describes a neural network technique for deriving principal components.

The principal component feature tiles 18 are utilized in generating weights which are to be transmitted along with the principal component feature tiles to generate a rough approximation of the original image as illustrated at 12. As can be seen at 19, a principal component feature tile $T_1$ is dot multiplied by a segment $S_1$ from the original image to from a weight $\omega_{11}$. This is done for all principal component feature tiles and for all image segments. Each segment may be approximated by the appropriate sum of the weighted principal component feature tiles. The image may be reconstructed from the appropriately positioned segment tile approximations, e.g., the weighted sum of the principal component feature tiles weighted by the weights for that segment. The image is then reconstructed using all of the segments.

In the generation of the weights the principal component feature tiles are multiplied with the segment of the original image to which they apply such that a dot product results. This dot product results in a weight for each of the segments of the original image. These weights, herein illustrated at 20 are utilized in combination with the principal component feature tiles to arrive at the approximation of the original image. The approximation of the original image is a reconstructed image utilizing only the weights and the principal component tiles, it being understood that the transmission of the weights and the principal component tiles involves a transmission of much less data than would be necessary in transmitting the original image. As such, tiling the image and deriving weights is one way to compress the image for transmission.

It will be appreciated that if for instance the original image was 512×512 in one embodiment the principal component feature tiles would be a stack of 16×16 tiles. Thus while there would be significant compaction in this compression process, easily a 20 to 1 reduction in transmitted data, the computational load for generating the tiles using of transform 16 and the generation of weights is excessive.

Figure 2:
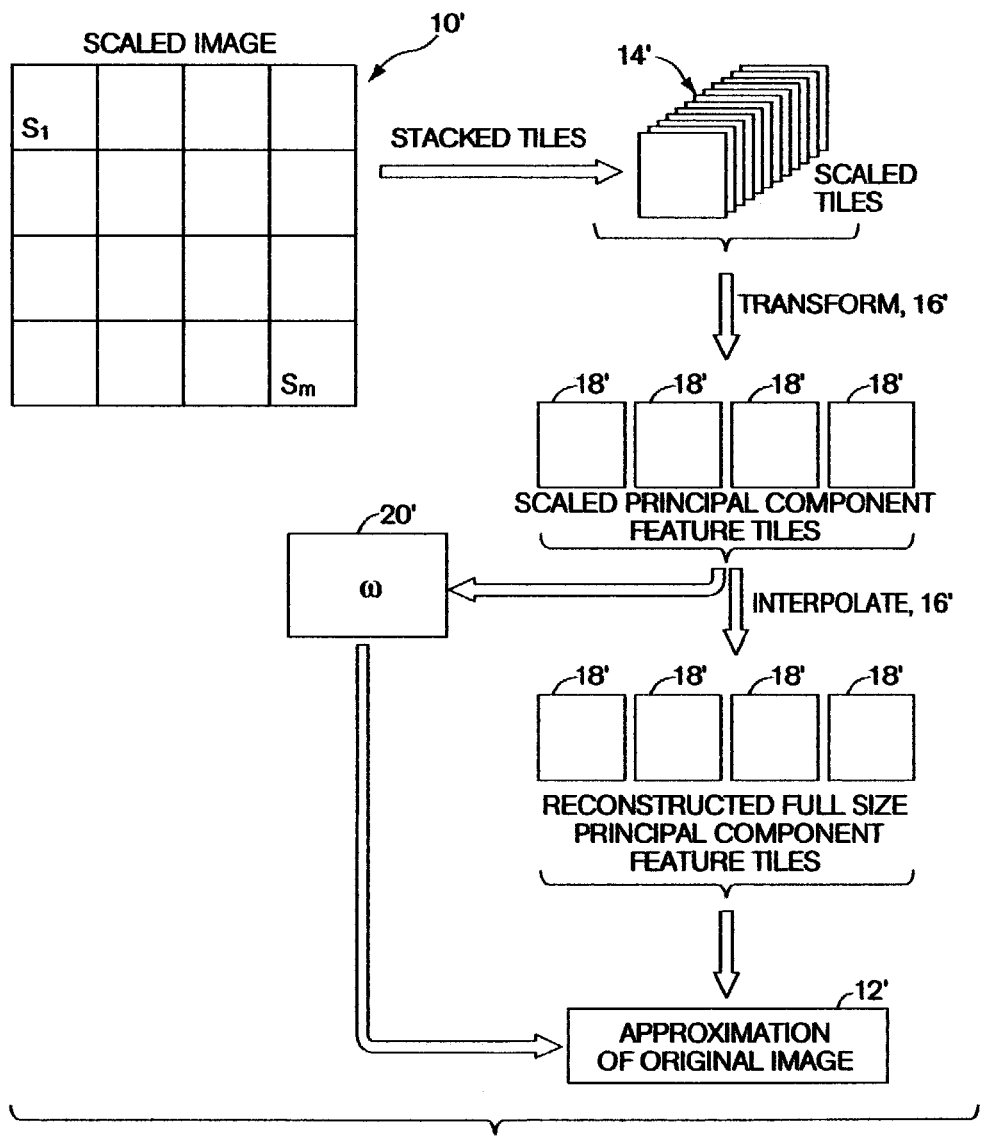
FIG. 2 is a diagrammatic illustration of the modeling of an image utilizing a scaled original image, scaled principal component feature tiles, interpolation of the scaled principal component feature tiles to full sized principal component feature tiles and the utilization of the weights associated with the scaled principal component feature tiles in combination with the reconstructed full size principal component feature tiles to reconstruct an approximation of the original image.

Referring to FIG. 2, assuming that one scales the original image so as to reduce it by half as illustrated at 10', this results in scaled down tiles 14' which also are one half the size of the original tiles associated with the system of FIG. 1. The scaled image, if it is half sized, would be a 256×256 image in which the scaled tiles would be an array of 8×8 tiles. It will be appreciated that the computation in number of bits required to represent the features of the image are cut by a factor of 4, assuming the scaled tiles were transformed as illustrated at 16'. The result is a set of scaled principal component feature tiles 18' which are used to generate appropriate weights.

It is the finding of this invention that such scaled principal component feature tiles in fact result in appropriate weights such that the reconstruction can take place utilizing the weights generated and the scaled principal component feature tiles.

In order to reconstruct the full size approximation of the original image as shown at 12', after generation of weights 20', one optionally needs to interpolate the scaled principal component feature tiles to increase their scale to the original size through a simple interpolation scheme here illustrated at 26. This results in reconstructed full size principal component feature tiles 18 which are then used in the reconstruction of the approximation of the original image. Alternatively no interpolation may be necessary and the scaled tiles can be used in the reconstruction.

As will be seen, an original 512×512 image is scaled down to a 256×256 image which results in scaled extraction feature tiles going from 16×16 to 8×8.

It is a finding of the subject invention that the weights associated with the dot product of the scaled principal component feature tiles with a scaled image and the full size principal component feature tiles multiplied with the full scale image are nearly equal. The result is that one may train on a scaled image with scaled features and recover feature weights which constitute the image model. By utilizing scaled images and scaled feature tiles one can reduce the computation load by a factor of 4. This factor may be increased for multiple levels of decomposition.

Figure 3:
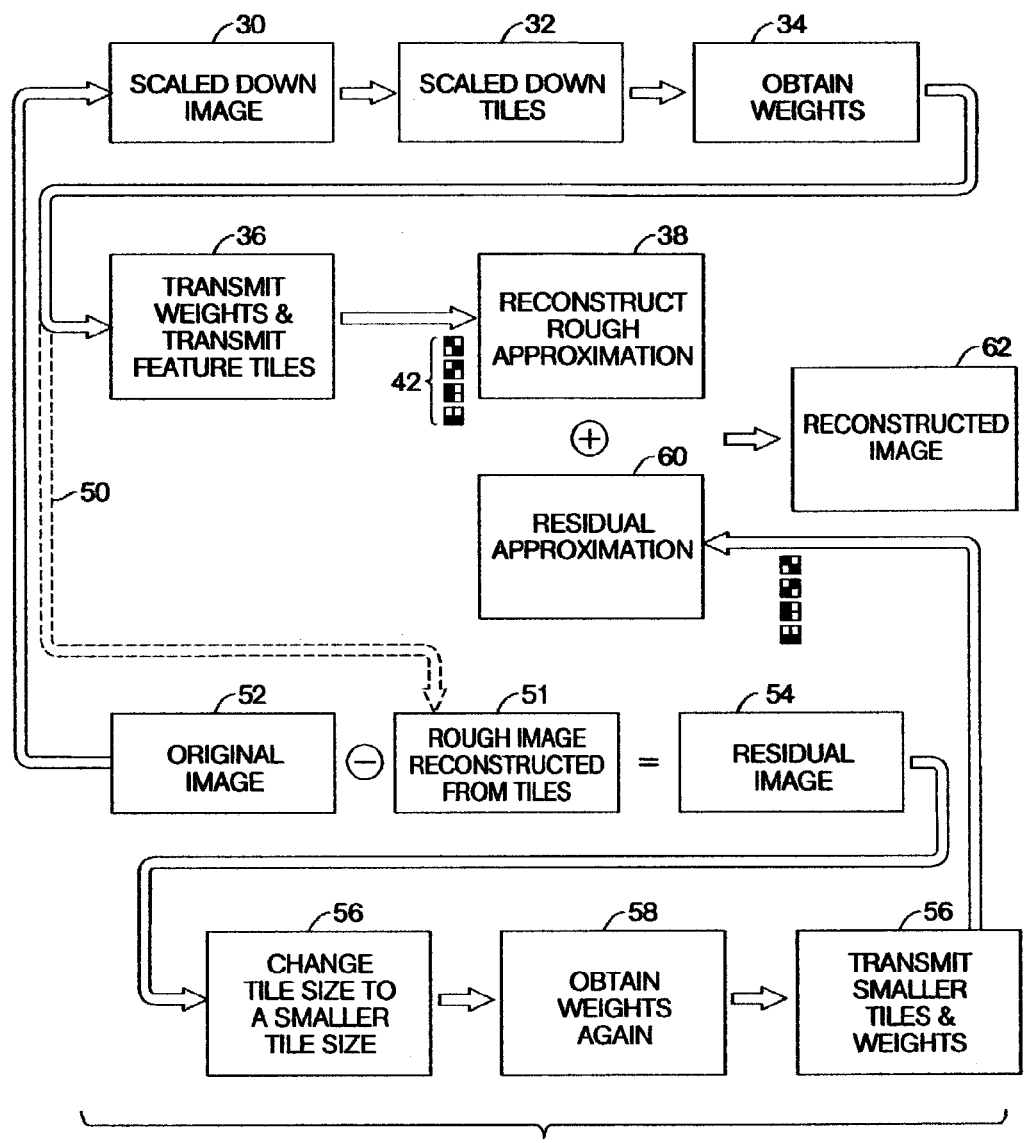
FIG. 3 is a diagrammatic illustration of the refinement of the image associated with FIG. 2 in which a residual approximation is added to the rough approximation.

Referring now to FIG. 3, one can reconstruct a rough approximation of the original image in the above manner. Thus a scaled down image 30 is utilized to generate scaled down principal component feature tiles 32 which are in turn utilized to obtain feature weights 34 that are transmitted at 36 along with the scaled feature tiles to obtain the aforementioned rough approximation, here illustrated at 38. Note as illustrated at 40 the scaled feature tiles are transmitted along with the associated weights shown at 42.

As illustrated by dotted line 50 the process can continue by subtracting the rough image 51 reconstructed from tiles from the original image here illustrated at 52 to obtain a residual image 54. One then scales down the residual image by changing the tile size to a smaller tile size as illustrated at 56, where again, one obtains weights as illustrated at 58 which are transmitted along with the smaller tiles to obtain a residual approximation 60. When the residual approximation is added to the rough approximation there is a reconstructed image 62 with a finer detail than possible with the rough approximation. For even further refinement, the process may be iteratively applied, with new residual approximations being added to the next previous reconstruction for even further fineness of detail.

Figure 4:
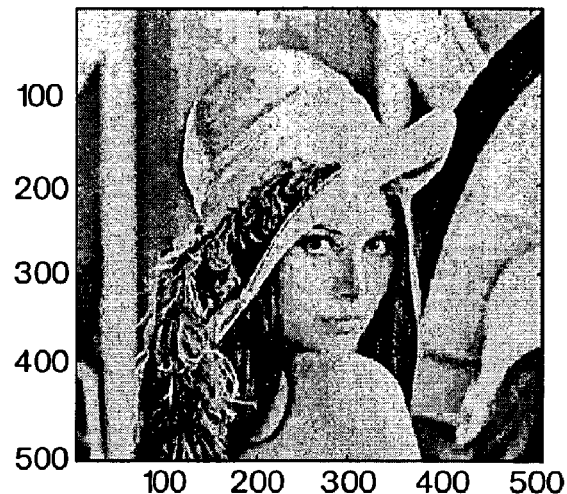
FIG. 4 is a reconstruction of an original image containing a model, Lena, in which the reconstructed image was derived from extracted principal component feature tiles scaled identically to the original image.
Figure 5:
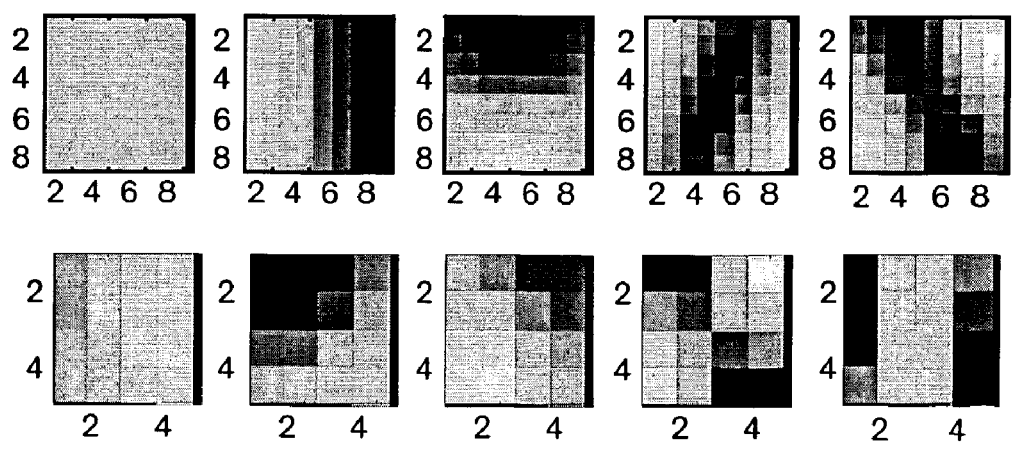
FIG. 5 is a diagrammatic representation of the extracted principal component tiles used for the reconstruction of FIG. 4.

Referring to FIG. 4, was is depicted is a reconstruction of a model, here Lena, using extracted principal component tiles as illustrated in FIG. 5.

Note that with respect to FIG. 3, since the residual and rough approximation or model images are orthogonal, the residual image may be further decomposed and additional features extracted. Furthermore, these features need not be at the same scale as the features extracted to create the original image model. That is, one may retile the residual image at a different scale and train on the resultant tile set. After training, each tile in the image will have a weight for each principal component feature at each scale. The weights yield a compressed model for the image. The extracted principal feature tiles as well as the coefficient weights for each feature for all image tiles must be transmitted to the receiver. The reconstruction of FIG. 4 uses five 8×8 and five 4×4 principal feature tiles. The result is at or near current state of the art compression: about 32 dB at 0.14 bpp. To this one adds another 12% for principal component feature tiles. Note that the principal component feature tiles are shown in FIG. 5.

In obtaining the result of FIG. 4 one avails oneself of a scanning method which benefits from residual correlation in the image. The Hilbert-scan is utilized for scanning the image, with the image result being delta coded. The Hilbert scan ensures that component weights in x and y dimensions will be scanned in close two-dimensional proximity. The correlations in these weights combined with delta coding contribute to an entropy reduction improving the potential rate. This, in effect, allows one to exploit local correlation in the image at the next higher scale. Other schemes for encoding could be used which may result in improved results.

Since the Hilbert scan is fractal in nature, the first 8×8 tile contains the first four 4×4 tiles, the second 8×8 tile contains the next four 4×4 tiles and so forth. This allows scaling without reconstituting the image while maintaining the Hilbert scanned order in all scales.

Although the results in FIG. 4 match the rate of the state of the art in PSNR vs rate, one has expended much more computation to achieve them.

In the subject invention it is the finding that one can use scale to limit the computation that is done.

How this is done is as follows: suppose one scales an image by averaging adjacent points. Then, for example, a 512×512 image could become a 256×256 image. Looking at the two images does not reveal much difference in the images in that they appear to be similar. The question then becomes would similarly scaled extraction of tiles yield similar principal component features. It is the finding of the subject invention that the answer to this question is yes. This is especially true for simple features where averaging and aliasing typically do not have a large effect.

Figure 6:
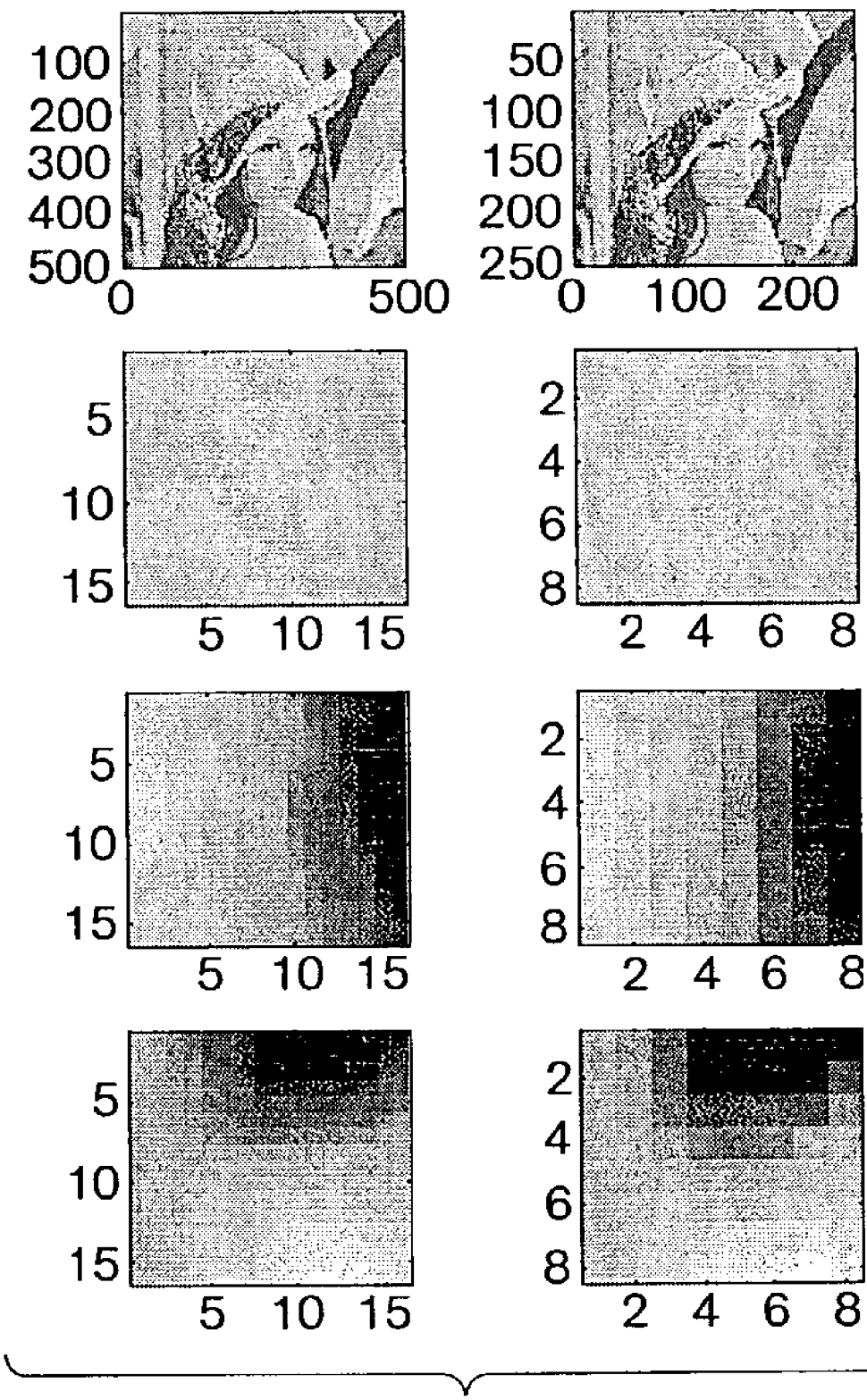
FIG. 6 is a series of reconstructed images, the first of the images reconstructed from full scale extracted principal component tiles and the second image constructed from scaled down principal component tiles, with images and the features associated with the two sets of principal component tiles being quite similar, thus leading to the ability to utilize smaller scale principal component tiles to reduce computational load.

FIG. 6 shows the scaled images and corresponding principal component feature tiles. Note the similarity in the extracted principal component feature tiles. However, one can go one step further. The tile coefficient weights will be nearly identical for the two decompositions. Therefore one can train on the quarter size image with quarter size tiles and derive principal component tiles which are similar to the full scale extraction which yield coefficient weights which are nearly identical to the full scale extraction.

The net result is that one can have reduced computation by a factor proportional to the square of the scaling. Moreover, one may reconstruct the full scale principal component feature tiles using interpolation although one only needs to send the scaled principal component feature tiles. Therefore, one can also reduce the overhead in transmitting the principal component feature tiles by a factor proportional to scaling squared. What this means, referring back to FIG. 2, is that it is not necessary in generating the approximation of the original image to use the reconstructed full size principal component feature tiles. The approximation of the original image 12' may in fact be generated utilizing the scale principal component feature tiles 18' thus reducing the overhead as described above.

It will be noted that if one has multiple levels of decomposition, the above savings will be increased, albeit with a minor loss in PSNR or rate this is because of the averaging of the image and the coarseness of the scaled tiles. However, this may not be noticeable.

In order to practice the subject invention one first scales the image to the appropriate level. Then one scales the image tiles. Then, one trains on the scaled image tiles and transmits the scaled principal component tiles and the coefficient weights to a receiver.

One then optionally interpolates the scaled principal component feature tiles and uses them with the weights to construct an image model.

Finally one repeats the process on the current image residual for all scales taking direct sum of image models to obtain the final model.

This process yields an image model of good fidelity requiring much less computation and fewer bits transmitted for the principal component tiles. The down side is some small loss in PSNR or, correspondingly, increase in rate for the same PSNR. However, can be seen in FIG. 7 there is hardly any difference between the scaled feature Lena reconstruction and the Lena reconstruction of FIG. 4 utilizing full size tiles.

Figures 7, 8, 9:
FIG. 7 is a rendering of the reconstructed original image utilizing scaled principal component feature tiles, indicating very little difference in this reconstruction from the reconstruction of FIG. 4.
FIG. 8 is a table showing rate distortion using scale which indicates compression at PSNR for extraction using scale; and, FIG. 9 is a table showing the result of using scaled feature extraction, with computation for the scaled feature extraction being about ⅝ of the original scheme.

As can be seen from FIG. 8, the table indicates compression and PSNR for extraction using scale, whereas as shown in FIG. 9, the table shows the result of using scaled feature extraction. Note that the PSNR and the rate are approximately equivalent.

As expected, computations for the scale feature extraction is about 5/8 of the original scheme, with the advantage improving dramatically as one adds more levels of processing.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for modeling an image comprising the steps of:

tiling an image at a predetermined scale to form small tile segments of the image;

combining the small segments of the image into a data matrix extracting principal components of the data matrix in terms of principal component feature tiles;

generating a set of coefficient weights corresponding to the principal component tiles;

scaling the principal component tiles to reduce the data therewith;

transmitting from a transmitting side the scaled principal component tiles and the weights associated with each image segment to a remote location;

interpolating the principal component tiles at the remote location to obtain full-scale principal component tiles;

computing a weighted sum of full-scale principal component tiles for each segment to obtain a coarse image at full scale;

constructing a coarse image at the transmitting side;

obtaining the difference between the original image and the coarse image at the transmitting side to obtain a residual image;

selecting a finer scale for the residual image;

producing finer scale residual image tiles from the finer scale residual image;

obtaining from the finer scale residual image tiles a finer set of principal component tiles;

forming a weighted sum of the finer-scaled principal component tiles to represent each residual image segment;

transmitting to the remote location the newly-obtained finer principal component tiles and the new weights associated with each residual image segment;

reconstructing the residual image at the remote location from the transmitted new, finer principal component tiles and the new weights associated therewith; and, at the remote location summing the coarse and residual images to obtain an improved image representation.

* * * * *